United States Patent [19]
Sato

[11] Patent Number: 5,329,511
[45] Date of Patent: Jul. 12, 1994

[54] OPTICAL HEAD CLEANING CARTRIDGE

[75] Inventor: Kenichi Sato, Tokyo, Japan

[73] Assignee: TEAC Corporation, Japan

[21] Appl. No.: 874,623

[22] Filed: Apr. 27, 1992

[30] Foreign Application Priority Data

Apr. 30, 1991 [JP] Japan .............................. 3-030251[U]

[51] Int. Cl.$^5$ .............................................. G11B 3/58
[52] U.S. Cl. ...................................................... 369/71
[58] Field of Search .................. 369/71, 291; 360/133, 360/128; 15/DIG. 12–14

[56] References Cited

FOREIGN PATENT DOCUMENTS

| | | | |
|---|---|---|---|
| 1-251483 | 10/1989 | Japan | 369/71 |
| 2-158975 | 6/1990 | Japan | 369/71 |
| 2-189777 | 7/1990 | Japan | 369/71 |
| 2-206079 | 8/1990 | Japan | 369/71 |
| 2-244470 | 9/1990 | Japan | 369/71 |
| 2-287988 | 11/1990 | Japan | 369/71 |
| 3-66082 | 3/1991 | Japan | 369/71 |

*Primary Examiner*—Stuart S. Levy
*Assistant Examiner*—David D. Davis
*Attorney, Agent, or Firm*—Andrus, Sceales, Starke & Sawall

[57] ABSTRACT

An optical head cleaning cartridge is adapted for use in an optical disk unit which includes an optical head located at a predetermined position in a specific operation mode of the optical disk unit and which uses the optical head to record information signals on and/or reproduce information signals from an optical disk which is accommodated within a standard type optical disk cartridge which is in conformance with a predetermined standard when loaded with the standard type optical disk cartridge. The optical head cleaning cartridge includes a first part having a size and a shape which are approximately the same as those of the standard type optical disk cartridge, a cleaning element provided at a position of the first part to confront the optical head when the optical head cleaning cartridge is loaded into the optical disk unit in the specific operation mode, a second part, connected to the first part, and including a driving part located at a position to allow manipulation thereof, and a transmitting mechanism, provided in the first and second parts, for transmitting power of the driving part to the cleaning element. The cleaning element cleans the optical head by rotating in response to the power of the driving part received via the transmitting mechanism.

13 Claims, 6 Drawing Sheets

OPTICAL HEAD CLEANING CARTRIDGE

BACKGROUND OF THE INVENTION

The present invention generally relates to optical head cleaning cartridges, and more particularly to an optical head cleaning cartridge which can clean an optical head of an optical disk unit by a simple operation.

An optical disk unit is provided with an optical head having an optical system which includes an objective lens, a prism and the like. Information signals are recorded on and/or reproduced from an optical disk by moving the optical head in a radial direction of the optical disk. The optical disk is accommodated within a protection cartridge, and the optical head scans the optical disk via a window which is provided in the cartridge.

The objective lens of the optical head confronts a recording surface of the optical disk and is exposed via an opening of the optical head. For this reason, dust or dirt inevitably adheres on the objective lens. If dust or dirt adheres on the objective lens, the recording and/or reproducing characteristic of the optical disk deteriorates.

Conventionally, when dust or dirt adheres on the objective lens, an outer cover of the optical disk unit is removed, and in some cases, circuit boards or the like are removed, to expose the objective lens. The surface of the exposed objective lens is cleaned by a cotton stick which holds alcohol or the like. After the surface of the objective lens is cleaned, the circuit boards or the like are mounted back to the original positions, and the outer cover is thereafter secured in place.

Accordingly, parts of the optical disk unit which are assembled in a complex manner with a high precision must conventionally be taken apart in order to clean the objective lens, and there is a problem in that the high-precision parts may be damaged during the taking apart or reassembling thereof. In addition, it is virtually impossible for the common user to carry out the above described cleaning of the objective lens, and there is a problem in that a serviceman (maintenance person) must make a trip to clean the objective lens. Furthermore, because the serviceman must make the trip to clean the objective lens, there also are problems in that considerable time, labor and cost are involved in the cleaning of the objective lens.

SUMMARY OF THE INVENTION

Accordingly, it is a general object of the present invention to provide a novel and useful optical head cleaning cartridge in which the problems described above are eliminated.

Another and more specific object of the present invention is to provide an optical head cleaning cartridge adapted for use in an optical disk unit which includes an optical head located at a predetermined position in a specific operation mode of the optical disk unit and which uses the optical head to record information signals on and/or reproduce information signals from an optical disk which is accommodated within a standard type optical disk cartridge which is in conformance with a predetermined standard when loaded with the standard type optical disk cartridge, comprising a first part having a size and a shape which are approximately the same as those of the standard type optical disk cartridge, a cleaning element provided at a position of the first part to confront the optical head when the optical head cleaning cartridge is loaded into the optical disk unit in the specific operation mode, a second part, connected to the first part, and including a driving part located at a position to allow manipulation thereof, and a transmitting mechanism, provided in the first and second parts, for transmitting power of the driving part to the cleaning element, where the cleaning element cleans the optical head by rotating in response to the power of the driving part received via the transmitting mechanism. According to the optical head cleaning cartridge of the present invention, it is possible to positively clean the optical head by a simple operation, and the optical head may be cleaned by the general user.

Other objects and further features of the present invention will be apparent from the following detailed description when read in conjunction with the accompanying drawings.

DESCRIPTION OF THE PREFERRED EMBODIMENTS

Figure 1:
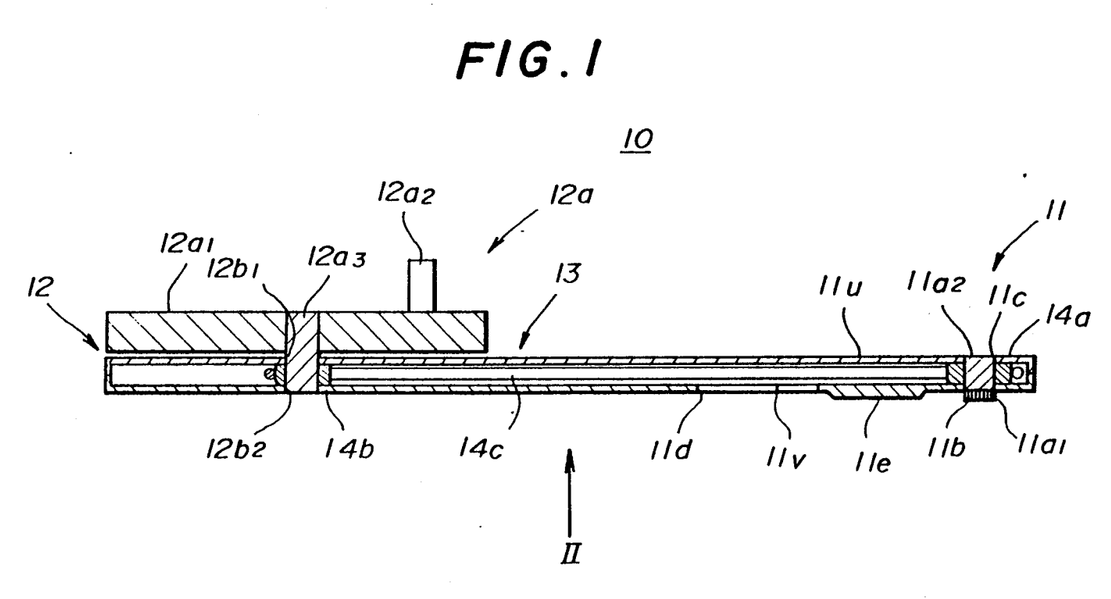
FIG. 1 is a view in vertical cross section showing a first embodiment of an optical head cleaning cartridge according to the present invention.
Figure 2:
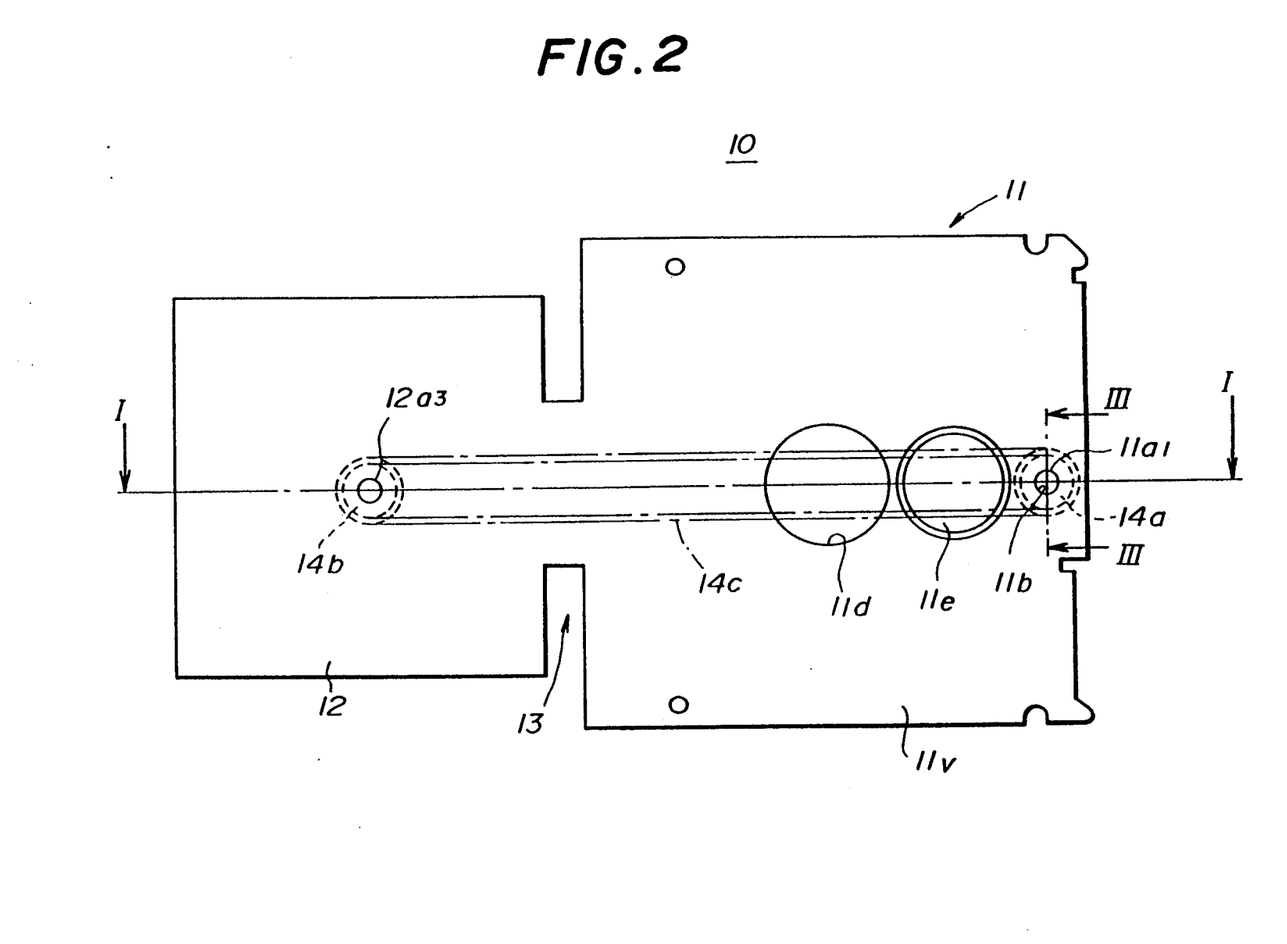
FIG. 2 is a bottom view showing the first embodiment.

FIG. 2 shows a bottom view of a first embodiment of an optical head cleaning cartridge 10 according to the present invention, and FIG. 1 shows a vertical cross section of the cleaning cartridge 10 taken along a line I—I in FIG. 2.

The cleaning cartridge 10 generally includes a main body 11 which is provided with a cleaning element 11a1, a driving part 12 which is provided with a driving means 12a, a connecting member 13 which connects the main body 11 and the driving part 12, and a power transmitting means 14 including pulleys 14a and 14b and a belt 14c.

The main body 11, the driving part 12 and the connecting member 13 are molded from a synthetic resin, for example. Upper and lower parts of the main body 11, the driving part 12 and the connecting member 13 are integrally formed in divisions. In other words, the upper parts of the main body 11, the driving part 12 and the connecting member 13 are formed by upper covers 11u, 12u and 13u which are formed into one piece after internal parts thereof are mounted. Similarly, the lower parts of the main body 11, the driving part 12 and the connecting member 13 are formed by lower covers 11v, 12v and 13v which are formed into one piece after internal parts thereof are mounted. The main body 11 has an external size and shape approximately the same as those of a standard type optical disk cartridge which is in conformance with a predetermined standard.

The main body 11 is inserted (loaded) into an optical disk unit 20 via a cartridge inserting opening in the same manner with which the standard type optical disk cartridge is inserted into the optical disk unit 20 when recording or reproducing information signals on or from an optical disk which is accommodated within the standard type optical disk cartridge. The lower cover 11v has a circular opening 11b, and this opening 11b confronts an objective lens of an optical head of the optical disk unit 20 when the main body 11 is in a loaded position within the optical disk unit 20 and a power source of the optical disk unit 20 is turned OFF. An opening 11c is formed in the upper cover 11u confronting the opening 11b. Generally, the objective lens of the optical head is located at a position on the outer side of the outermost periphery of the optical disk within the loaded standard type optical disk cartridge in the state where the power source of the optical disk unit 20 is OFF.

In addition, a circular opening 11d is formed in the lower cover 11v of the main body 11. This opening 11d has a size which is slightly larger than that of a turntable of the optical disk unit 20, and this opening 11d is provided at a position such that the opening 11d confronts the turntable when the main body 11 is in the loaded position.

Furthermore, a projection 11e is formed on the lower cover 11v of the main boy 11, between the openings 11b and 11d. This projection 11e is tapered and has a truncated cone or truncated trapezoid shape, for example. The projection 11e makes contact with the side surface of a cover of the optical head when the main body 11 is in the loaded position and the optical head moves.

Figure 3:
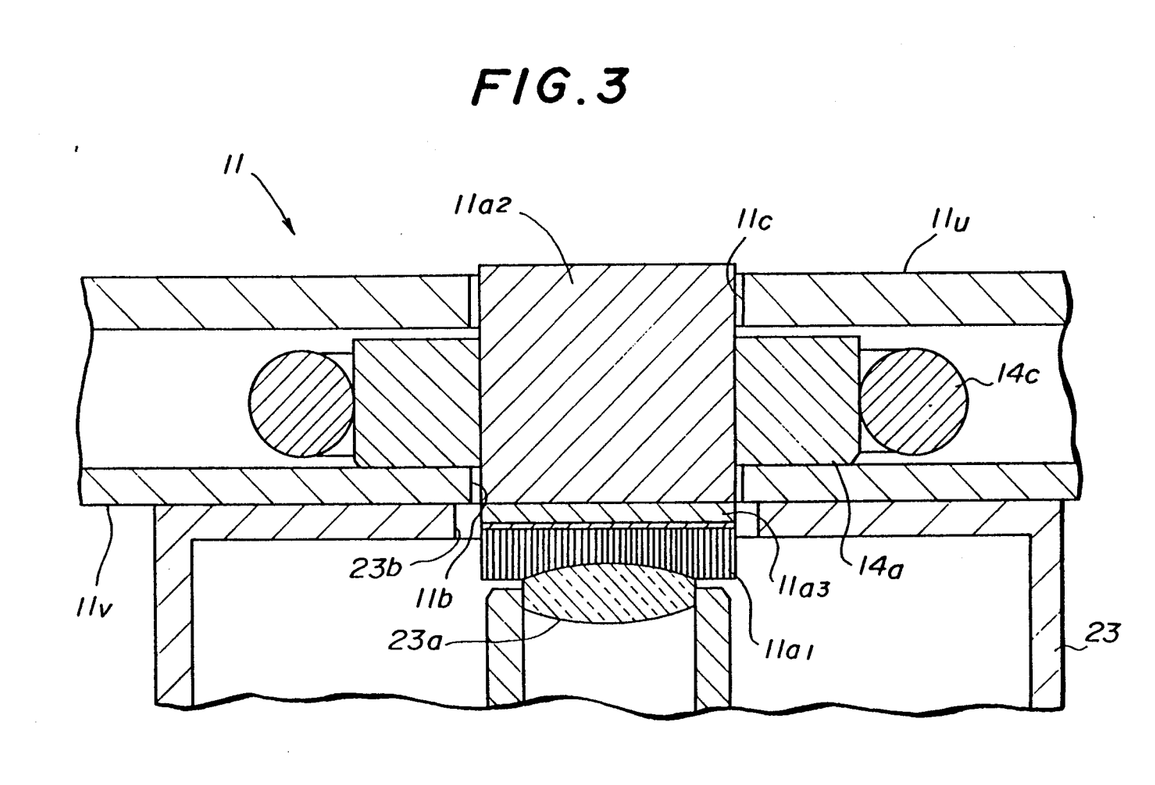
FIG. 3 is a cross sectional view showing the first embodiment along a line III—III in FIG. 2.

FIG. 3 is an enlarged view taken along a line III—III in FIG. 2.

As shown in FIG. 3, the cleaning element 11a1 is provided in the openings 11b and 11c of the main body 11, so that a shaft 11a2 of the cleaning element 11a1 is rotatable supported between the openings 11b and 11c. A pulley 14a is fixed around the central part of the shaft 11a2, and the belt 14c of the power transmitting means 14 is wound around this pulley 14a. The cleaning element 11a1 is made up of a soft and flexible brush which would not scratch or damage the lens surface of the objective lens of the optical head. For example, the cleaning element 11a1 has a circular column or a ring shape, and the brush part of the cleaning element 11a1 is detachably adhered onto the lower end of the shaft 11a2 by a two-way adhesive tape or the like via a soft and resilient member 11a3 which may be a sponge, for example.

A circular opening 12b1 is formed in the upper cover 12u of the driving part 12, and an opening 12b2 having an identical shape is formed in the lower cover 12v at a position confronting the opening 12b1. A crank 12a1 and a handle 12a2 of the driving means 12a are mounted above the openings 12b1 and 12b2, driving shaft 12a3 of the driving means 12a is rotatably supported between the openings 12b1 and 12b2, and a pulley 14b is fixed to the central part of the driving shaft 12a3. The belt 14c of the power transmitting means 14 is wound around the pulley 14b.

The connecting member 13 penetrates the cartridge inserting opening of the optical disk unit 20 in the state where the main body 11 is in the loaded position within the optical disk unit 20, and in this state, the driving part 12 projects outside the optical disk unit 20. As will be described later, when the main body 11 is inserted into the optical disk unit 20 via the cartridge inserting opening, the main body 11 slightly moves downwardly due to the operation of an internal mechanism of the optical disk unit 20. For this reason, the connecting member 13 has a shape with a certain margin relative to the cartridge inserting opening so that the connecting member 13 will not interfere with the downward movement of the main body 11. In addition, the belt 14c of the power transmitting means 14 is movably provided within the connecting member 13.

Next, a brief description will be given of the construction of an essential part of the optical disk unit 20, so as to explain the operation of the cleaning cartridge 10.

Figure 4:
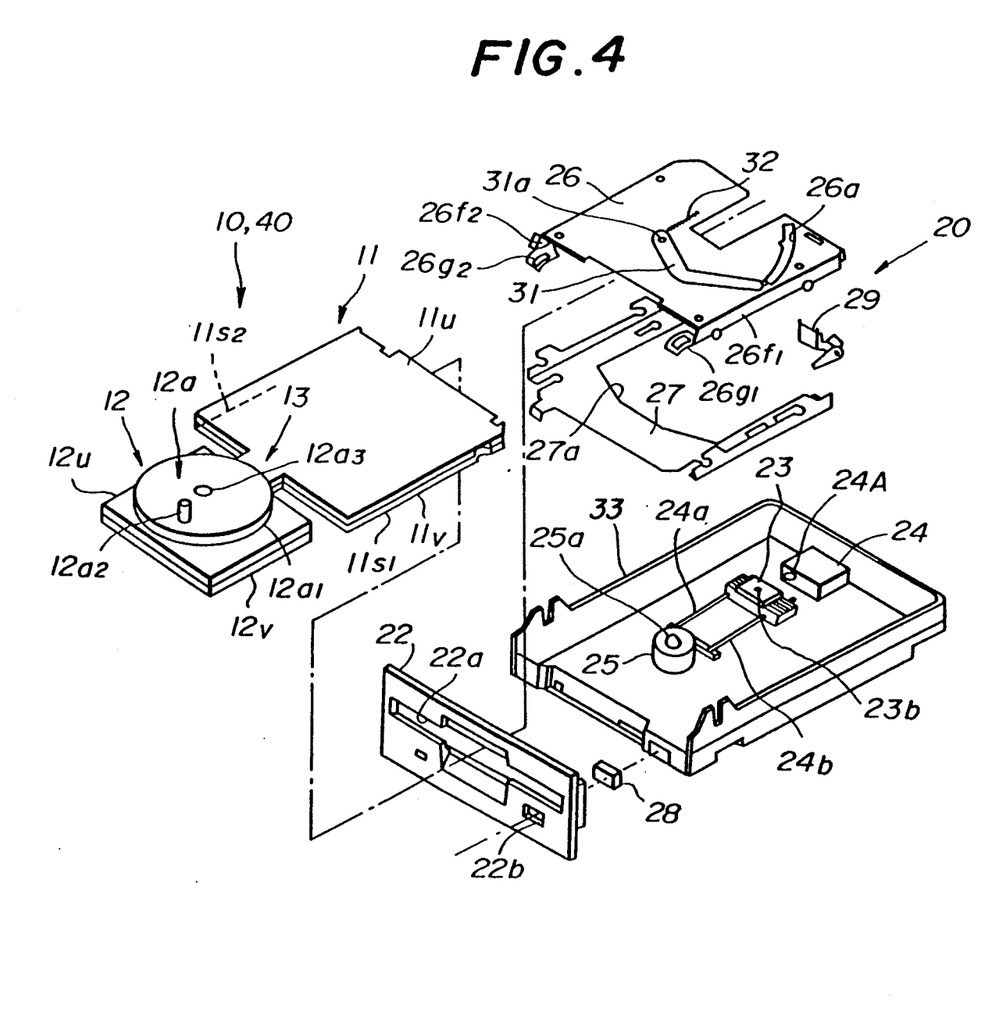
FIG. 4 is a disassembled perspective view showing an essential part of an optical disk unit to which the present invention is applied.

FIG. 4 is a disassembled perspective view of the optical disk unit 20, but only the parts required to explain the operation of the cleaning cartridge 10 are shown, and the illustration of other unrelated parts is omitted.

In FIG. 4, the optical disk unit 20 generally includes a bezel 22, a frame 33, an optical processing part 24 and a turntable 25 which are fixed at predetermined positions within the frame 33, a holder 26, and a slide member 27. The optical disk unit 20 is also provided with an eject button 28, a lock lever 29 and the like.

A cartridge inserting opening 22a through which the standard type optical disk cartridge and the cleaning cartridge 10 are inserted and extracted, and an opening 22b through which a part of the eject button 28 projects to the outside, are formed in the bezel 22. This bezel 22 is fixed to the front surface part of the frame 33. The holder 26 is movable in the cartridge inserting and extracting directions and in up and down directions perpendicular to the cartridge inserting and extracting directions. A lever 31 is provided on the holder 26, and the holder 26 has an elongated hole 26a in which a pin provided on one end of the lever 31 slides. The other end of the lever 31 is connected to the end part of a tension coil spring 32, and the lever 31 is pivottable about a fulcrum 31a located in a vicinity of this other end of the lever 31.

The slide member 27 has an opening 27a, and is arranged so that the turntable 25 and the like are positioned inside the opening 27a. In addition, the slide member 27 is movable in the cartridge inserting and extracting directions. The turntable 25 and the optical head 23 are located within a space between the holder 26 and the slide member 27.

The optical head 23 is guided by rails 24a and 24b, and is movable between the turntable 25 and the optical processing part 24. The optical head 23 includes optical system parts such as an objective lens and a prism.

A laser beam emitted from a laser diode within the optical processing part 24 is irradiated via a beam splitter and a window 24A, and the optical path of the laser beam is changed by the prism within the optical head 23. The laser beam further travels through an objective lens 23a and an opening 23b of the optical head 23, and is converged in focus on the optical disk surface within the optical disk cartridge. The reflected beam from the optical disk surface passes through the objective lens 23a and the prism, and is supplied to the optical processing part 24 via the window 24A to be reproduced therein.

Next, a description will be given of the operation of cleaning the optical head 23 of the optical disk unit 20.

First, the power source of the optical disk unit 20 is turned OFF, and the user inserts main body 11 of the cleaning cartridge 10 shown in FIG. 4 into the optical disk unit 20 via the cartridge inserting opening 22a. By this insertion of the cleaning cartridge 10, the pin at the tip end of the lever 31 which is provided on the holder 26 is engaged by the leading part of the main body 11, and the lever 31 pivots counterclockwise about the fulcrum 31a against the force exerted by the coil spring 32. In addition, the lock lever 29 is pushed by the leading part of the main body 11, and the holder 26 is moved downwardly by a known mechanism (not shown) in response to this pushing of the lock lever 29. As a result, the main body 11 of the cleaning cartridge 10 moves downwardly together with the holder 26.

Figure 5:
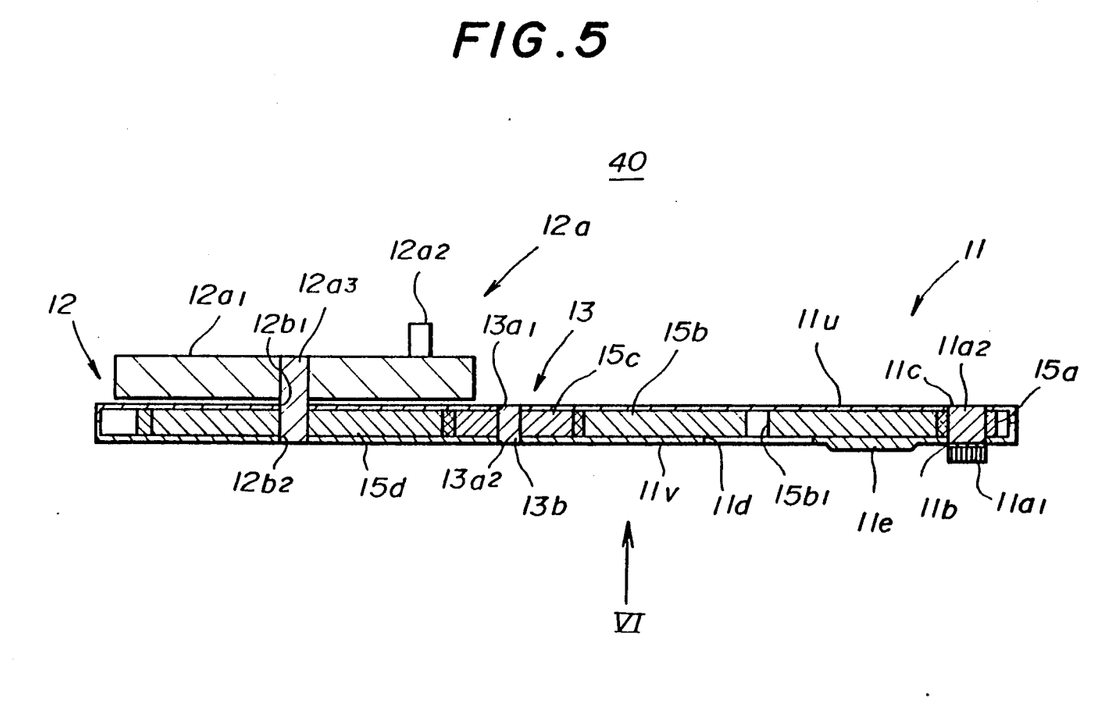
FIG. 5 is a view in vertical cross section showing a second embodiment of the optical head cleaning cartridge according to the present invention.

In this state, the upper surface of the optical head 23 makes contact with the lower surface of the lower cover 11v of the main body 11 as shown in FIG. 5, and the tip end of the cleaning element 11a1 of the main body 11 makes contact with the objective lens 23a of the optical head 23 via the opening 23b of the optical head 23. At the same time, the opening 11d in the lower cover 11v of the main body 11 engages the turntable 25. By this engagement of the opening 11d and the turntable 25 and by the guide mechanism of side plates 26f1 and 26f2 of the holder 26 with respect to side surfaces 11s1 and 11s2 of the main body 11, the main body 11 is positioned within the optical disk unit 20 and the contact position of the cleaning element 11a1 relative to the objective lens 23a becomes fixed.

In this state, the driving part 12 projects outside the optical disk unit 20 via the cartridge inserting opening 22a. In addition the connecting member 13 penetrates the cartridge inserting opening 22a of the optical disk unit 20, and a part of the connecting member 13 also projects outside the optical disk unit 20 via the cartridge inserting opening 22a. Hence, the main body 11 on one side of the bezel 22 is completely inside the optical disk unit 20, while the driving part 12 on the other side of the bezel 22 is completely outside the optical disk unit 20.

Accordingly, although the cleaning cartridge 10 is inserted into the optical disk unit 20 and the main body 11 is completely inside the optical disk unit 20, it is possible to manipulate the handle 12a2 of the driving means 12a at the driving part 12 and rotate the crank 12a1. When the crank 12a1 rotates, the driving power is transmitted from the driving shaft 12a3 to the pulley 14a via the pulley 14b and the belt 14c. Further, the pulley 14a rotates the cleaning element 11a1 via the shaft 11a2. Therefore, the cleaning element 11a1 rotates and cleans the lens surface of the objective lens 23a of the optical head 23.

If considerable dust or dirt is adhered on the lens surface of the objective lens 23, a cleaning liquid such as absolute alcohol may be applied to the cleaning element 11a1 during a first cleaning operation and a subsequent cleaning operation may be made using a dry new cleaning element 11a1.

Normally, in the state where the power source of the optical disk unit 20 is turned OFF, the optical head 23 is located at a position which is on the outer side of the outermost periphery of the recording surface of the optical disk. For this reason, when the cleaning cartridge 10 is loaded into the optical disk unit 20 in the state where the power source is turned OFF, the cleaning element 11a1 of the main body 11 in the loaded position always confronts the objective lens 23a of the optical head 23 within the optical disk unit 20.

The projection 11e formed on the lower surface of the lower cover 11v of the main body 11 is provided at a position such that the projection 11e makes contact with the side surface of the cover of the optical head 23 when the main body 11 is in the loaded position. Therefore, even if the power source of the optical disk unit 20 is turned erroneously turned ON in the state where the main body 11 is in the loaded position, the projection 11e acts as a stopper and prevents the optical head 23 from moving to the inner periphery of the turntable 25, that is, to the left in FIG. 1.

When extracting the cleaning cartridge 10 from the optical disk unit 20, the eject button 28 shown in FIG. 4 is pushed. A known mechanism (not shown) raises the holder 26 in response to the pushing of the eject button 28. As a result, hook parts 26g1 and 26g2 respectively provided at the lower ends of the side plates 26f1 and 26f2 of the holder 26 engage the lower end parts 11s1 and 11s2 of the main body 11, and the rising holder 26 raises the main body 11. By this operation, the opening 11d separates from the turntable 25. Furthermore, the lock lever 29 pushes the main body 11 in the cartridge ejecting direction, and the cleaning cartridge 10 is ejected via the cartridge inserting opening 22a of the optical disk unit 20.

Figure 6:
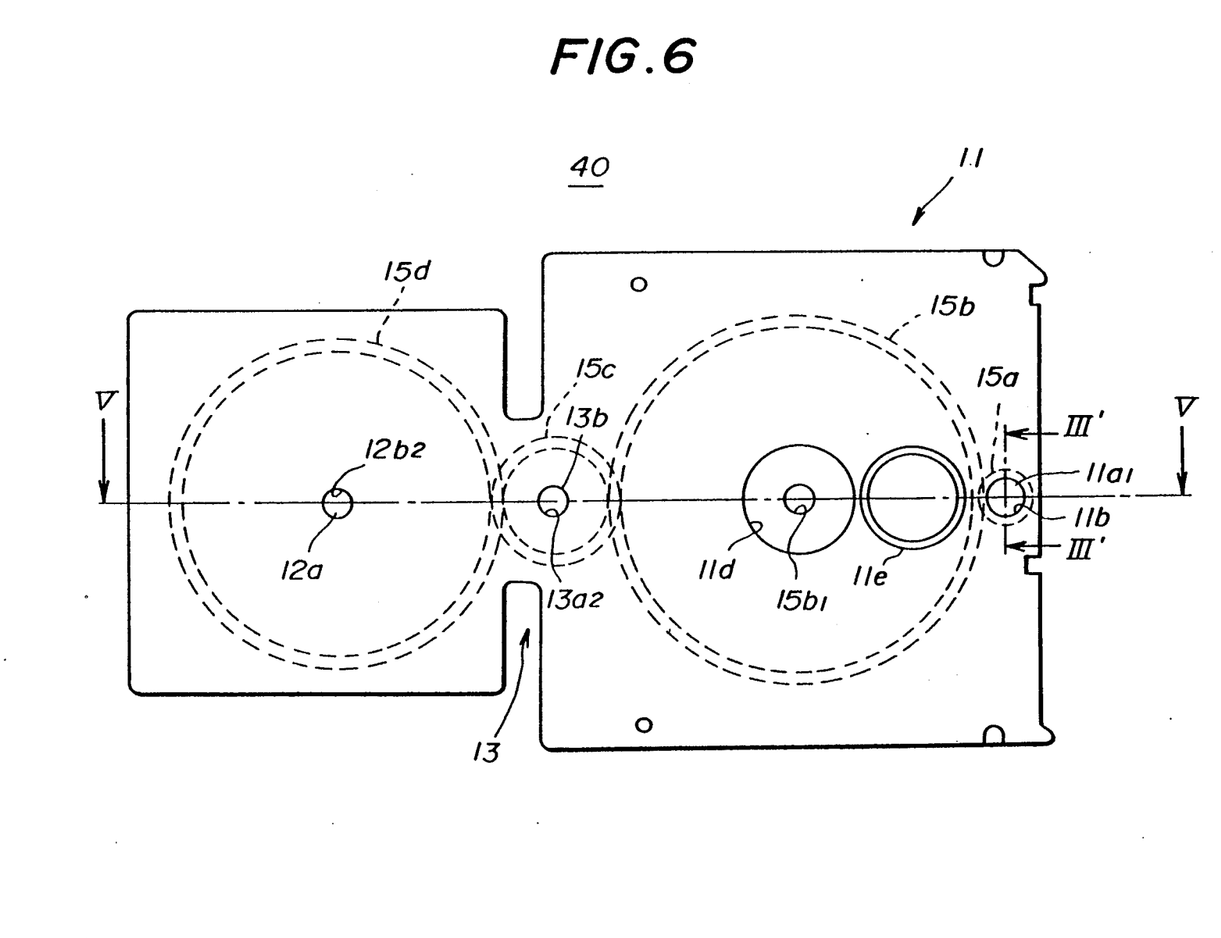
FIG. 6 is a bottom view showing the second embodiment.

FIG. 6 shows a bottom view of a second embodiment of an optical head cleaning cartridge 40 according to the present invention, and FIG. 5 shows a vertical cross section of the cleaning cartridge along a line V—V in FIG. 6.

This cleaning cartridge 40 uses a power transmitting means 15 made up of four gears 15ar, 15b, 15c and 15d in place of the power transmitting means 14 of the first embodiment made up of the belt 14c and the pulleys 14a and 14b. The construction of the cleaning cartridge 40 other than the power transmitting means 15 is the same as that of the first embodiment. Hence, in FIGS. 5 and 6, those parts which are the same as those corresponding parts in FIGS. 1 through 3 are designated by the same reference numerals, and a description thereof will be omitted.

In the power transmitting means 15 of the cleaning cartridge 40, the first gear 15a is fixed to the shaft 11a2 which has the cleaning element 11a1 fixed to the lower end thereof. The second gear 15b has a hole 15b1 at a central part thereof, and this second gear 15b meshes with the first gear 15a. The third gear 15c is fixed to an intermediate shaft 13b which is rotatably supported between the openings 13a1 and 13a2 which are respectively formed in the upper and lower covers 13u and 13v. This third gear 15c meshes with the second gear 15b. The fourth gear 15d is fixed to the driving shaft 12a3. The crank 12a1 and the handle 12a2 of the driving means 12 are mounted on the driving shaft 12a3 above the upper cover 12u of the driving part 12. This fourth gear 15d meshes with the third gear 15c. The rotational power of the driving shaft 12a3 is transmitted to the shaft 11a2 of the cleaning element 11a1 via the fourth gear 15d, the third gear 15c, the second gear 15b and the first gear 15a.

Accordingly, by inserting the cleaning cartridge 40 into the optical disk unit 20 in the same manner as the cleaning cartridge 10 and rotating the handle 12a2 of the driving means 12a of the driving part 12 which projects outside the optical disk unit 20, the rotational power applied to the crank 12a1 is transmitted to the cleaning element 11a1 by the action of the power transmitting means 15 which is made up of the four gears 15d through 15a. As a result, the cleaning element 11a1 rotates and cleans the lens surface of the objective lens 23a of the optical head 23.

When the main body 11 of the cleaning cartridge 40 is in the loaded position within the optical disk unit 20, the turntable 25 fits into the opening 11d in the lower cover 11v of the main body 11. In addition, a center spindle 25a which projects from the center of the turntable 25 fits into the hole 15b1 in the second gear 15b. By this engagement of the opening 15b1 and the center spindle 25a and by the guide mechanism of side plates 26f1 and 26f2 of the holder 26 with respect to side surfaces 11s1 and 11s2 of the main body 11, the main body 11 is positioned within the optical disk unit 20 and the contact position of the cleaning element 11a1 relative to the objective lens 23a becomes fixed.

Generally, the turntable 25 of the optical disk unit 20 is rotatable in the state where the power source of the optical disk unit 20 is OFF. Accordingly, the second gear 15b is rotatable in the engaged state where the center spindle 25a of the turntable 25 engages the hole 15b1 of the second gear 25b, and the operation of the power transmitting means 15 will not be interfered.

The main body 11 of the cleaning cartridge 40 can be extracted from the optical disk unit 20 in the same manner as the extraction of the main body 11 of the cleaning cartridge 10 described above.

The cleaning cartridge 40 includes the upper covers 11u, 12u and 13u and the lower covers 11v, 12v and 13v, similarly to the cleaning cartridge 10. Hence, the pulleys 14a and 14b of the cleaning cartridge 10 rotate while making sliding contact with the inner surfaces of the upper and lower covers 11u, 12u, 13u, 11v, 12v and 13v, but the gears 15a through 15d of the cleaning cartridge 40 rotate while making sliding contact with the inner surfaces of the upper and lower covers 11u, 12u, 13u, 11v, 12v and 13v.

A cross sectional view along a line III'—III' in FIG. 6 on an enlarged scale becomes essentially the same as that shown in FIG. 3 except that the pulley 14a and the belt 14c will be replaced by the first gear 15a.

In the first and second embodiments described above, the driving means 12a of course include a driving device such as a motor.

In each of the embodiments described above, the cleaning cartridge 10 or 40 is inserted into the optical disk unit 20 to clean the optical head 23 in the state where the power source of the optical disk unit 20 is turned OFF. However, if the optical head 23 is located at a predetermined position during a specific operation mode of the optical disk unit 20, the position of the cleaning element 11a1 is selected so that the cleaning element 11a1 of the cleaning cartridge 10 or 40 in the loaded position confronts the optical head 23, and the position of the cleaning element 11a1 is not limited to that of the embodiment.

Further, the present invention is not limited to these embodiments, but various variations and modifications may be made without departing from the scope of the present invention.

What is claimed is:

1. An optical head cleaning cartridge adapted for use in an optical disk unit which includes an optical head located at a predetermined position in a specific operation mode of the optical disk unit and which uses the optical head to record information signals on and/or reproduce information signals from an optical disk which is accommodated within an optical disk cartridge, said optical head cleaning cartridge comprising:

a first casing assembly, said first casing assembly having a supporting shaft rotatably mounted with respect thereto and having external height, width, and depth dimensions which are substantially the same as those of said optical disk cartridge;

a cleaning element provided on said supporting shaft of said first casing assembly and engageable with the optical head when the optical head cleaning cartridge is loaded into the optical disk unit with the latter in the specific operation mode;

a second casing assembly rigidly and permanently connected to said first casing assembly by a connecting member integrally connecting said first and second casing assemblies, said first and second casing assemblies and said connecting member being formed of coplanar, one piece top and one piece bottom members;

a driving unit which is mounted on the top of said second casing assembly and located generally parallel to the one piece top member of said first and second casing assemblies and the connecting member at a position to allow manipulation of said driving unit in a state in which the optical head cleaning cartridge is loaded into the optical disk unit;

a transmitting mechanism housed within said first and second casing assemblies and said connecting member, said transmitting mechanism having means for transmitting power from said driving unit to said cleaning element via said connecting member;

said driving unit further including a driving shaft generally parallel to said supporting shaft on said first casing assembly, said driving shaft rotatably connecting said driving unit to said transmitting mechanism;

said cleaning element cleaning the optical head by rotating in response to said driving unit transmitting power via said transmitting mechanism.

2. The optical head cleaning cartridge as claimed in claim 1, wherein said first casing assembly includes an opening, and said cleaning element makes contact with the optical head via said opening.

3. The optical head cleaning cartridge as claimed in claim 1, wherein said second casing assembly includes an opening, and said driving shaft projects outside said second casing assembly via said opening.

4. The optical head cleaning cartridge as claimed in claim 1, wherein the optical head of the optical head unit includes an objective lens which is exposed, and said cleaning element cleans the objective lens of the optical head.

5. The optical head cleaning cartridge as claimed in claim 1, wherein said cleaning element is made of a soft material selected from a group comprising sponge, cotton and brush.

6. The optical head cleaning cartridge as claimed in claim 1, wherein said specific operation mode is a mode in which a power source of the optical disk unit is OFF.

7. The optical head cleaning cartridge as claimed in claim 1, wherein said first casing assembly includes a stopper part which prevents movement of the optical head by making contact therewith when the optical head cleaning cartridge is loaded into the optical disk unit.

8. The optical head cleaning cartridge as claimed in claim 1, wherein said driving unit includes a manipulating handle which is manipulated.

9. The optical head cleaning cartridge as claimed in claim 1, wherein said first casing assembly is so formed as to be substantially accommodated in its entirety within the optical disk unit when the optical head cleaning cartridge is loaded into the optical disk unit.

10. The optical head cleaning cartridge as claimed in claim 1, wherein said second casing assembly is positioned substantially outside the optical disk unit when the optical head cleaning cartridge is loaded into the optical disk unit.

11. The optical head cleaning cartridge as claimed in claim 9, wherein said second casing assembly is positioned substantially outside the optical disk unit when the optical head cleaning cartridge is loaded into the optical disk unit.

12. The optical head cleaning cartridge as claimed in claim 1, wherein the optical head of the optical head unit includes a lens which has the optical axis, and said cleaning element has a circular shape having a radius which is at least approximately the same as that of the lens.

13. The optical head cleaning cartridge as claimed in claim 1, wherein said cleaning element is rotated about an axis which is approximately parallel to the optical axis of the lens of the optical head.

* * * * *